United States Patent [19]
Zeigler et al.

[11] Patent Number: 4,919,578
[45] Date of Patent: Apr. 24, 1990

[54] RIVETLESS NUT PLATE AND FASTENER

[75] Inventors: Henry J. Zeigler, Orlando; Bruce L. Frisinger, Windermere, both of Fla.

[73] Assignee: Martin Marietta, Bethesda, Md.

[21] Appl. No.: 204,285

[22] Filed: Jun. 9, 1988

[51] Int. Cl.$^5$ .................. F16B 37/04; F16B 39/28
[52] U.S. Cl. .................. 411/113; 411/173; 411/183; 411/999
[58] Field of Search ........... 411/108, 112, 113, 103, 411/173, 177, 183, 432, 109, 999

[56] References Cited

U.S. PATENT DOCUMENTS

| | | |
|---|---|---|
| 3,123,120 | 3/1964 | Grimm et al. |
| 3,124,408 | 3/1964 | Oestereicher .................. 411/183 |
| 3,315,721 | 4/1967 | Koehl . |
| 3,495,643 | 2/1970 | Dey et al. .................. 411/113 |
| 3,695,324 | 10/1972 | Gulistan . |
| 3,809,139 | 5/1974 | Strain . |
| 3,810,291 | 5/1974 | Ladouceur . |
| 4,018,133 | 4/1977 | Chaivre et al. . |
| 4,186,787 | 2/1980 | Husain . |
| 4,295,766 | 10/1981 | Shaw . |
| 4,490,083 | 12/1984 | Rebish . |
| 4,557,650 | 12/1985 | Molina .................. 411/108 |
| 4,610,072 | 9/1986 | Muller . |
| 4,649,732 | 3/1987 | Molina . |
| 4,730,967 | 3/1988 | Warkentin . |
| 4,732,518 | 3/1988 | Toosky .................. 411/108 |

OTHER PUBLICATIONS

Drawing of fastener of Simmonds Fastener Technologies Inc.
Three pages from brochure(s) relating to "Rivetless Floating Nut Assembly", and an installation tool for such fasteners of Deutsch Fastener Corporation.

Primary Examiner—Neill R. Wilson
Attorney, Agent, or Firm—Burns, Doane, Swecker & Mathis

[57] ABSTRACT

A nut plate and nut are disclosed wherein the nut plate secures the nut to a mounting plate. The nut plate includes a projection which is adapted to be received by a hole in the mounting plate to prevent relative rotation between the nut plate and the mounting plate. The nut is provided with a flange about a periphery of the nut with a portion of the nut being received within a tubular portion of the nut plate and within an opening in the mounting plate.

9 Claims, 4 Drawing Sheets

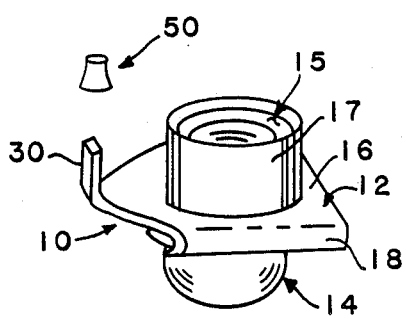
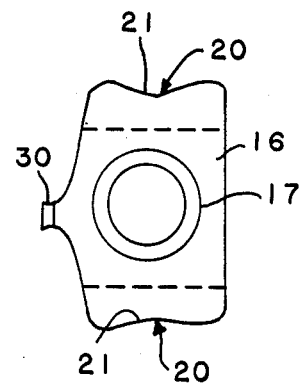
FIG. 1
FIG. 4
FIG. 5
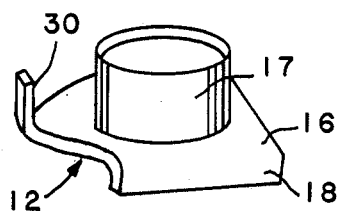
FIG. 2
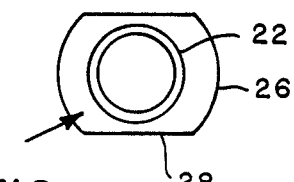
FIG. 6
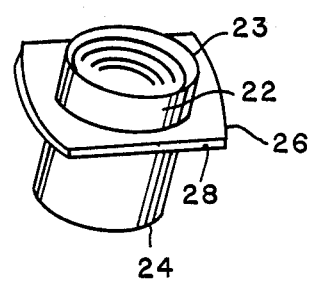
FIG. 3
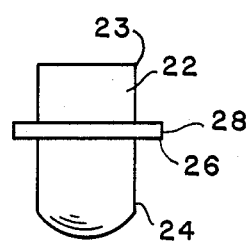
FIG. 7

RIVETLESS NUT PLATE AND FASTENER

BACKGROUND AND SUMMARY OF THE PRESENT INVENTION

The present invention relates generally to fasteners and more particularly relates to fateners having nut plates which are to be securely attached to a mounting plate.

Anchor nut fasteners are known wherein a nut plate is attached to a mounting plate. Typically, a threaded nut is retained by the nut plate in a floating manner in order to facilitate insertion of a bolt into the nut. Rotation of the nut relative to the nut plate is prevented by sidewalls of the nut plate which engage a portion of the nut.

In such fasteners, it is necessary to mount the nut plate onto the mounting plate securely and to prevent rotation of the nut plate relative to the mounting plate. In a known arrangement, the nut plate may be secured to the mounting plate by way of rivets which are provided on either side of a centrally located nut. Such an arrangement is undesirable, however, because of the need to drill three holes in the mounting plate including two holes for the rivets and one hole which provides access to the threaded nut for a threaded bolt. Especially where a significant number of such fasteners are to be used, the need to provide three relatively accurately spaced holes in the mounting plate results in a considerable expenditure of time and labor. Moreover, the three closely spaced holes may in some cases unduly weaken the mounting plate creating the potential for cracks and damage to the mounting plate.

In another known arrangement for securing a nut plate to a mounting plate, rotation of the nut plate is intended to be prevented by knurling which is provided on a tubular portion of an attaching sleeve. The attaching sleeve has a flange at one end and the tubular portion is inserted through the nut plate and into a hole which has been provided in the mounting plate. The tubular portion is then deformed to retain the nut plate on the mounting plate and the knurling is intended to frictionally engage the sidewalls of the hole in the mounting plate. However, to provide the knurling on the tubular portion requires an expenditure of time and effort. Moreover, if the engagement between the knurled tubular portion and the sidewalls of the hole is not adequate of if excessive torque is applied to the nut, an unacceptable rotation of the nut plate may result.

In those arrangements where nut plate is secured by rivets, replacement of a defective nut plate is relatively time consuming and difficult due to the need to remove the rivets.

Accordingly, it is an object of the present invention to provide a nut plate for either fixed or floating nuts which may be secured to a mounting plate without the use of rivets.

Yet another object of the present invention is to provide a nut plate in which relative rotation between the nut plate and a mounting plate on which the nut plate is fastened is prevented in an economical and efficient manner.

Still another object of the present invention is to provide a nut plate wherein the potential to unduly weaken the member on which the nut plate is fastened is reduced.

Yet still another object of the present invention is to provide an improved fastener including a nut plate and nut according to the present invention.

A still further object of the present invention is to provide an improved fastener including a nut plate and nut wherein assembllly and disassembly is facilitated the reliability of the fastener and the mounting plate is increased.

These and other objects are accomplished by a nut plate and fastener according to the present invention wherein the nut plate includes a generally flat portion which is provided with means to securely receive a nut. Means are also provided to secure the nut plate to a mounting plate with the means including a tubular portion which extends into a hole which has been provided in the mounting plate. The nut plate also includes a torque pin or projection which is spaced away from the tubular portion and which is adapted to be received within a torque pin hole or recess in the mounting plate. The projection prevents a relative rotation of the nut plate and the mounting plate.

The fastener according to the present invention comprises a nut plate including a generally flat portion which is provided with means to securely receive a nut. The nut includes a flange or skirt which is provided circumferentially about a longitudinal axis of the nut. A tubular portion of the nut extends beyond the flange and is adapted to be received within a tubular portion of the nut plate. The tubular portion of the nut plate is adapted to be deformed, swaged, spun or crimped so as to securely fasten the nut plate to a mounting plate. The nut plate also includes a torque pin or projection which is spaced away from the tubular portion and which is adapted to be received within a torque pin hole or recess in the mounting plate. The projection prevents a relative rotation of the nut plate and the member.

BRIEF DESCRIPTION OF THE DRAWINGS

Preferred embodiments of the present invention will be described in greater detail with reference to the accompanying drawings, wherein like members bear like reference numerals and wherein:

FIG. 1 is a perspective view of a nut plate and nut according to the present invention;

FIG. 2 is a perspective view of the nut plate of FIG. 1;

FIG. 3 is a perspective view of the nut of FIG. 1;

FIG. 4 is an top view of the nut plate of FIG. 2 prior to assembly with the nut of FIG. 3;

FIG. 5 is a side view of the nut plate of FIG. 4;

FIG. 6 is an top view of the nut of FIG. 3;

FIG. 7 is a side view of the nut of FIG. 6;

DETAILED DESCRIPTION OF THE PREFERRED EMBODIMENTS

Figure 8:
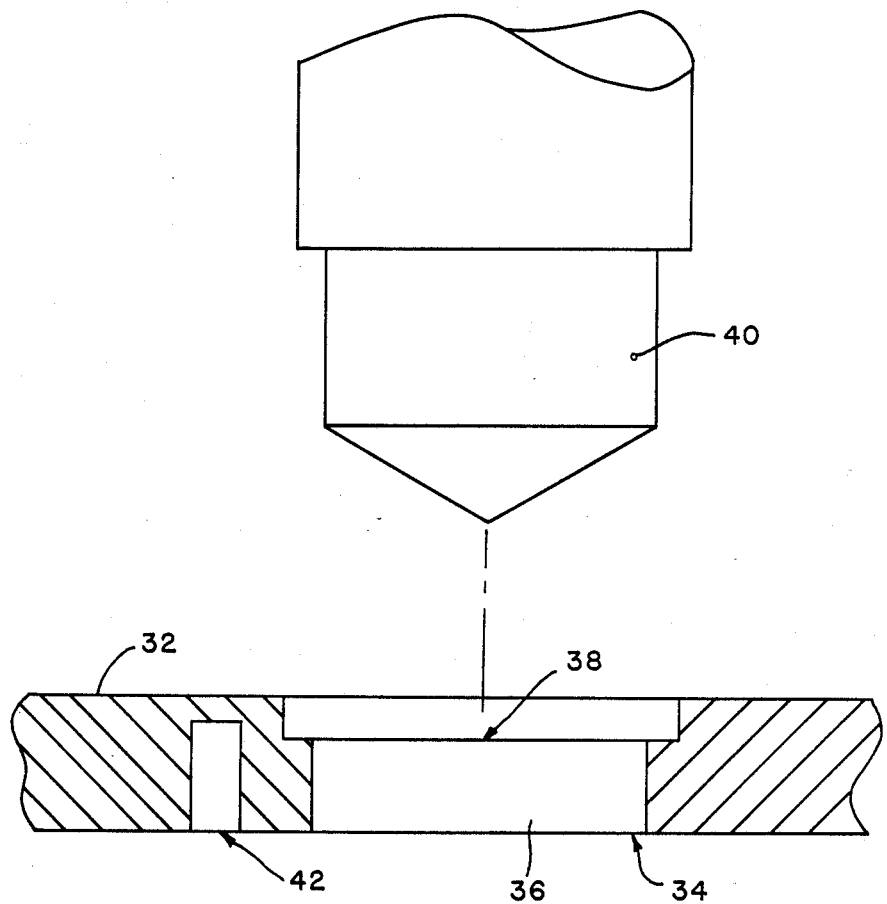
FIG. 8 is a side view in partial cross section of a mounting plate which has been prepared to receive the nut plate and nut of FIG. 1.

With reference to FIG. 1, a fastener 10 according to the present invention includes a nut plate 12 and a nut 14 which is partially received within the nut plate 12. The nut may be any of a variety of screw fasteners and may be provided with any desired suitable, conventional features such as a locking feature. The nut 14 and the nut plate 12 are preferably of metal, for example, stainless steel.

With reference also to FIG. 2, the nut plate 12 includes a relatively flat portion 16 which is provided with deformable sidewalls 18. The sidewalls 18 each have a recessed portion 20, see FIG. 4, having a smooth configuration 21 corresponding to the nut 14.

The nut 14 includes a tubular portion 22 which has been provided with internal threads so as to receive a fastener member such as a threaded bolt (not shown). The tubular portion 22 is open at at least one end 23 and is preferably closed at the other end 24 to form a dome nut. If desired, the nut may be open at both ends. The type of threads and the dimensions of the nut and threads may be varied as desired.

Figure 11:
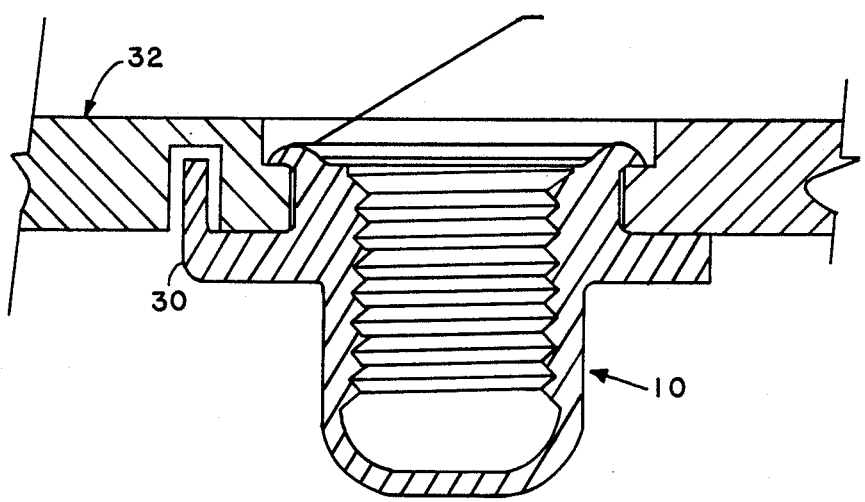
FIG. 11 is a side view in partial cross section of a nut and nut plate according to the present invention wherein the nut and nut plate are integral.

A flange 26 or skirt is provided about the tubular portion 22 of the nut. The flange 26 includes two parallel straight edges 28 which are provided on either side of the flange 26. The flange 26 is dimensioned so as to be floatingly received by the sidewalls 18 of the nut plate 12 when the sidewalls 18 have been deformed around the flange 26. If desired, the nut 22 could be rigidly fastened to the nut plate 12 by securely gripping the edges 28 of the flange 26 between the flat portion 16 and the sidewalls 18. Alternatively, the nut could be integrally formed with the nut plate, see FIG. 11.

The flange 26 is provided about the tubular portion of the nut 22 spaced away from either end of the nut. In this way, a part of the tubular portion including the open end 23 of the nut is provided on one side of the flange 26. Another part of the tubular portion of the nut is provided on the other side of the flange 26. When the nut 14 is received within the nut plate 12, the part of the tubular portion 22 including the open end 23 of the nut is received within the tubular portion 17 of the nut plate. If desired, an O-ring seal 15 may be provided between the nut 14 and the nut plate 12 between the open end 23 and the tubular portion 17.

The nut plate 12 also includes a projection 30 or tab which extends generally perpendicularly to the flat portion 16 of the nut plate 12. The projection 30 is formed integrally with the nut plate 12 and preferably is provided on the periphery of the flat portion 16 midway between the sidewalls 18.

During assembly, with reference to FIG. 8, a member or mounting plate 32 on which the nut plate and nut according to the present invention are to be mounted is provided with a stepped bore 34. The stepped bore 34 includes a first portion 36 which is dimensioned so as to receive the tubular portion 17 of the nut plate 12. The stepped bore also includes a second portion 38 which has a slightly larger diameter. The stepped bore 34 may be provided in the member 32 using a step drill bit 40 in a suitable, conventional manner.

The member 32 is also provided with a torque pin hole 42 or recess which may be blind or open and which is spaced away from the stepped bore 34 by a distance corresponding to the distance between the projection 30 and the tubular portion 17 of the nut plate 12. The torque pin hole 42 is provided on the side of the member 32 having the first portion 36 of the stepped bore 34. The torque pin hole 42 preferably does not extend completely through the member 32 so as to minimize the effect of the recess on the member 32. If desired, however, the torque pin hole could of course extend completely through the member 32 (not shown). If the torque pin hole extends completely through the member 32, it may be desirable to provide a plug 50 or sealing cap (see FIG. 1) in the torque pin hole adjacent to the projection 30 to close an exposed end of the hole.

Figure 9:
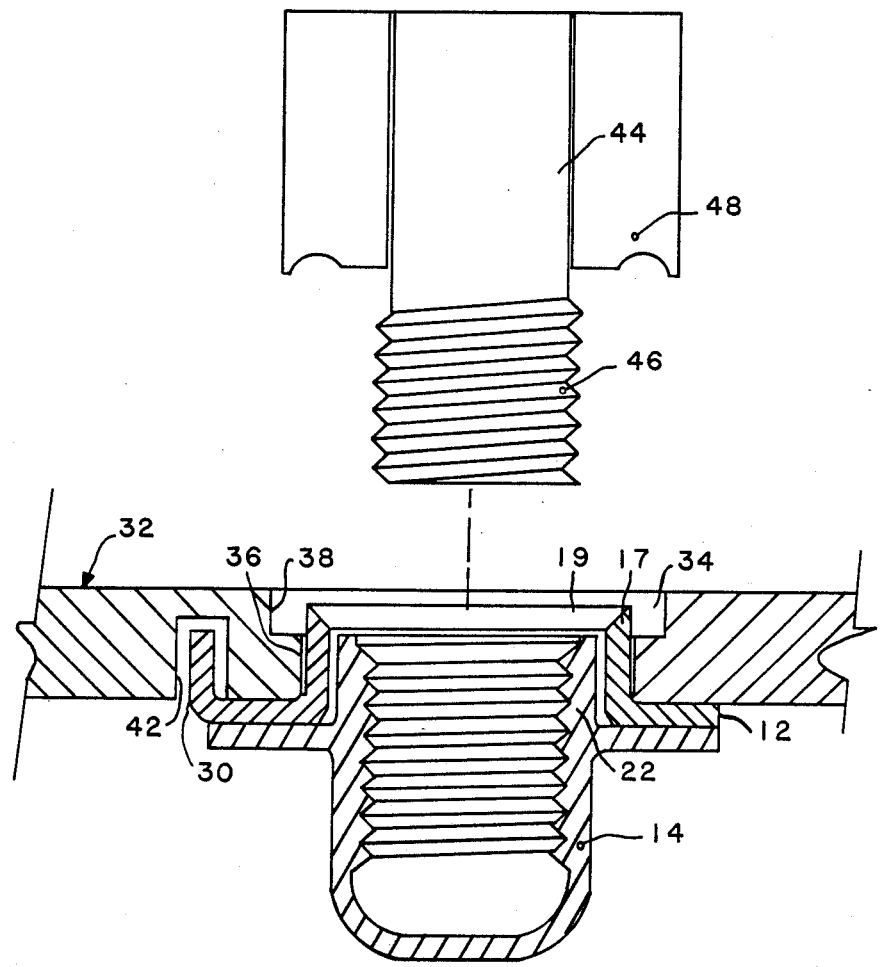
FIG. 9 is a side view in partial cross section of the mounting plate of FIG. 8 during the installation of the nut plate and nut of FIG. 1.
Figure 10:
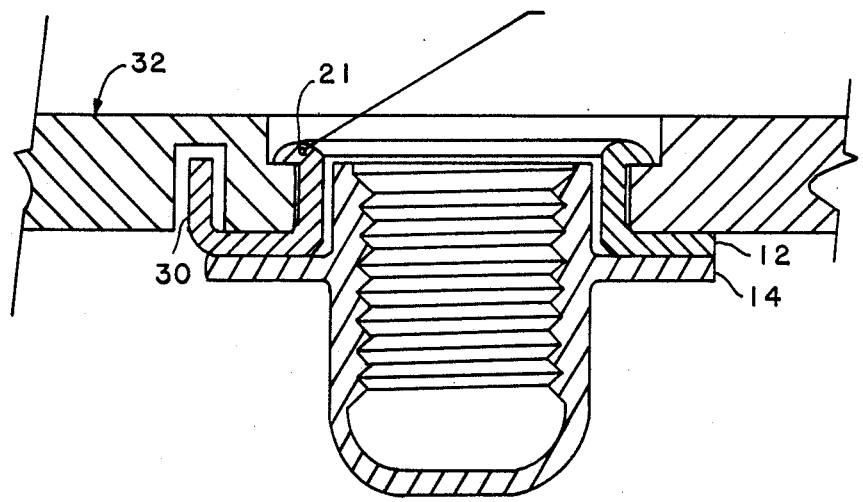
FIG. 10 is a side view in partial cross section of the nut plate and nut of FIG. 1 installed on the mounting plate of FIG. 8.

With reference now to FIG. 9, the nut plate 12 is positioned adjacent to the mounting plate 32 with the tubular portion 17 of the nut plate inserted into the stepped bore 34. Preferably, the end of the tubular portion 17 of the nut plate extends slightly beyond the end of the first portion 36 of the stepped bore 34 but not beyond the second portion 38 of the stepped bore 34. The end 19 of the tubular portion 17 of the nut plate is tapered so as to facilitate the deformation of the end of the tubular portion by a tool member 44. The nut 14 is floatingly retained by the sidewalls 18 of the nut plate 12 and the tubular portion 22 of the nut 12 extends into the stepped bore 34 of the member 32. The phrase "floatingly" is meant to include that the nut is arranged to move radially in a direction which is transverse to the longitudinal axis of the nut plate's tubular portion 22, as shown, for example, in FIG. 10. Preferably, the tubular portion 22 of the nut 12 does not extend beyond the first portion 36 of the stepped bore 34. The projection 30 extends into the torque pin hole 42 of the member 32. The torque pin hole 42 is sized so as to snugly receive the projection without obstructing the mating of the nut plate 12 with the mounting plate 32.

To secure the tubular portion 17 of the nut plate 12 to the mounting plate 32, a threaded portion 46 or holding screw of the tool 44 is engaged with the threaded portion of the nut 14. A suitably configured end or swaging die 48 of the tool 44 is then brought into engagement with the end 19 of the tubular portion of the nut plate 12 so as to swage or deform the end 19 into the second portion 38 of the stepped bore 34. After deformation, the end 19 of the tubular portion 17 preferably is smoothly curved as shown at 21, (see FIG. 10). As desired, the end of the nut plate may be swaged, spun or crimped against the mounting plate.

If desired, the stepped bore 34 may be replaced with a countersunk bore (not shown) wherein the countersunk portion of the bore corresponds to the second portion 38 of the stepped bore 34. The end 19 of the tubular portion of the nut plate 12 may then be simply flared of deformed outwardly so as to securely mount the nut plate onto the mounting plate 32.

By arranging the nut 14 so that the open end 23 of the nut extends into the tubular portion 17 of the nut plate (and in turn into the first portion of the stepped bore 34 or the countersunk bore), the ease of assembly and the reliability of the fastener are increased. While the nut is being floatingly secured to the nut plate 12, the engagement of the open end 23 of the nut in the tubular portion 17 of the nut plate facilitates the proper positioning of the nut with respect to the nut plate. Moreover, since the threaded portion of the nut extends into the member 32, a more compact arrangement is provided for a fastener having the same extent of threads.

By providing the O-ring between the nut and the nut plate, the fastener according to the present invention may eliminate the need for a rubber boot and a corresponding bonding operation for the fastener. Moreover, since the alignment of the nut or the nut plate is ensured and since the threaded portion of the nut is provided in close proximity to the surface of the member 32 where the threaded bolt is to be inserted, the engagement of the threaded bolt with the nut is facilitated.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. For example, an entirely satisfactory arrangement for certain end use applications could involve a floating nut fastener, wherein the open end 23 of the nut 14 is positioned substantially coplanar with the surface of the flange 26 that faces the member 32. Variations and changes may be made by others without departing from the spirit of the present invention and it is expressly intended that all such variations and changes which fall within the spirit and scope of the present invention as defined in the claims, be embraced thereby.

What is claimed is:

1. A nut plate for use with a threaded fastener, the nut plate comprising:
   a generally flat portion having a passageway therethrough;
   means for securing said nut plate to a mounting plate, said means for securing including a tubular portion which is integral with said generally flat portion and which extends generally perpendicularly to said flat portion;
   means for floatingly securing a threaded fastener to said nut plate adjacent said passageway whereby a threaded member may be received by said threaded fastener; and
   means for preventing relative rotation between said nut plate and said mounting plate, said means for preventing relative rotation including a projection which extends generally perpendicularly from said flat portion, said projection being provided on the same side of said flat portion as the tubular portion of said means for securing.

2. The nut plate of claim 1, wherein said means for floatingly securing a threaded fastener to said nut plate includes a first and second sidewalls of said flat portion which are adapted to be loosely deformed about a portion of said threaded fastener.

3. A nut plate for use with a threaded fastener, the nut plate comprising:
   a generally flat portion having a passageway therethrough;
   means for securing said nut plate to a mounting plate, said means for securing including a tubular portion which extends generally perpendicularly to said flat portion;
   means for floatingly securing a threaded fastener to said nut plate adjacent said passageway whereby a threaded member may be received by said threaded fastener; and
   means for preventing relative rotation between said nut plate and said mounting plate, said means for preventing relative rotation including a projection which extends generally perpendicularly from said flat portion, said projection being provided on the same side of said flat portion as the tubular portion of said means for securing, said means for floatingly securing a threaded fastener to said nut plate including first and second sidewalls of said flat portion which are adapted to be loosely deformed about a portion of said threaded fastener, said projection being provided midway between said first and second sidewalls and at a periphery of said flat portion.

4. A nut plate and nut adapted to be mounted on a mounting plate having an opening therethrough, comprising:
   a nut plate comprising a generally flat portion having a passageway therethrough, said nut plate further comprising means for securing said nut plate to a mounting member, said means for securing including a tubular portion which extends generally perpendicularly to said flat portion, means for floatingly securing a nut to said nut plate adjacent said passageway whereby a threaded member may be received by said nut, means for preventing relative rotation between said nut plate and said mounting plate, said means for preventing relative rotation including a projection which extends generally perpendicularly from said flat portion, said projection being provided on the same side of said flat portion as the tubular portion of said means for securing; and
   a nut, said nut having a tubular portion which is threaded and a flange which is provided about a periphery of the tubular portion, said tubular portion having at least one open end extending generally perpendicularly with respect to the flange, said at least one free end of said tubular portion being received within said tubular portion of said nut plate through said passageway of said nut plate.

5. The nut plate and nut of claim 4, wherein said means for floatingly securing a nut to said nut plate includes first and second sidewalls of said flat portion which are loosely deformed about a portion of said nut.

6. The nut plate and nut of claim 5, wherein said projection is provided midway between said first and second sidewalls and at a periphery of said flat portion.

7. A fastener which is adapted to be mounted on a mounting plate having an opening therethrough and a hole adjacent the opening, comprising:
   a nut including a tubular portion having an internal thread; and
   a nut plate including means for floatingly securing the nut to the nut plate, means for securing the nut plate to the mounting plate said means for securing the nut plate to the mounting plate including an integral tubular portion which is adapted to be received by said opening of said mounting plate and means for preventing rotation of said nut plate relative to said mounting plate, said means for preventing rotation including an integral projection which is adapted to be received by said hole of said mounting plate.

8. A fastener which is adapted to be mounted on a mounting plate having an opening therethrough and a hole adjacent the opening, comprising:
   a nut including a tubular portion having an internal thread; and
   a nut plate including means for floatingly securing the nut to the nut plate, means for securing the nut plate to the mounting plate and means for preventing rotation of said nut plate relative to said mounting plate, said means for preventing rotation including an integral projection which is adapted to be received by said hole of said mounting plate, said means for securing the nut plate to the mounting plate including a tubular portion formed integrally in the nut plate which is adapted to extend into the opening of the mounting plate, whereby said tubular portion may be deformed at one end to secure the nut plate to the mounting plate, at least a portion of said nut extending into said tubular portion of said nut plate.

9. The fastener of claim 8, wherein the tubular portion of said nut extends into the opening of said mounting plate when said nut and nut plate are secured to said mounting plate, said nut also including a peripheral flange which is spaced away from an open end of the nut.

* * * * *